UNITED STATES PATENT OFFICE.

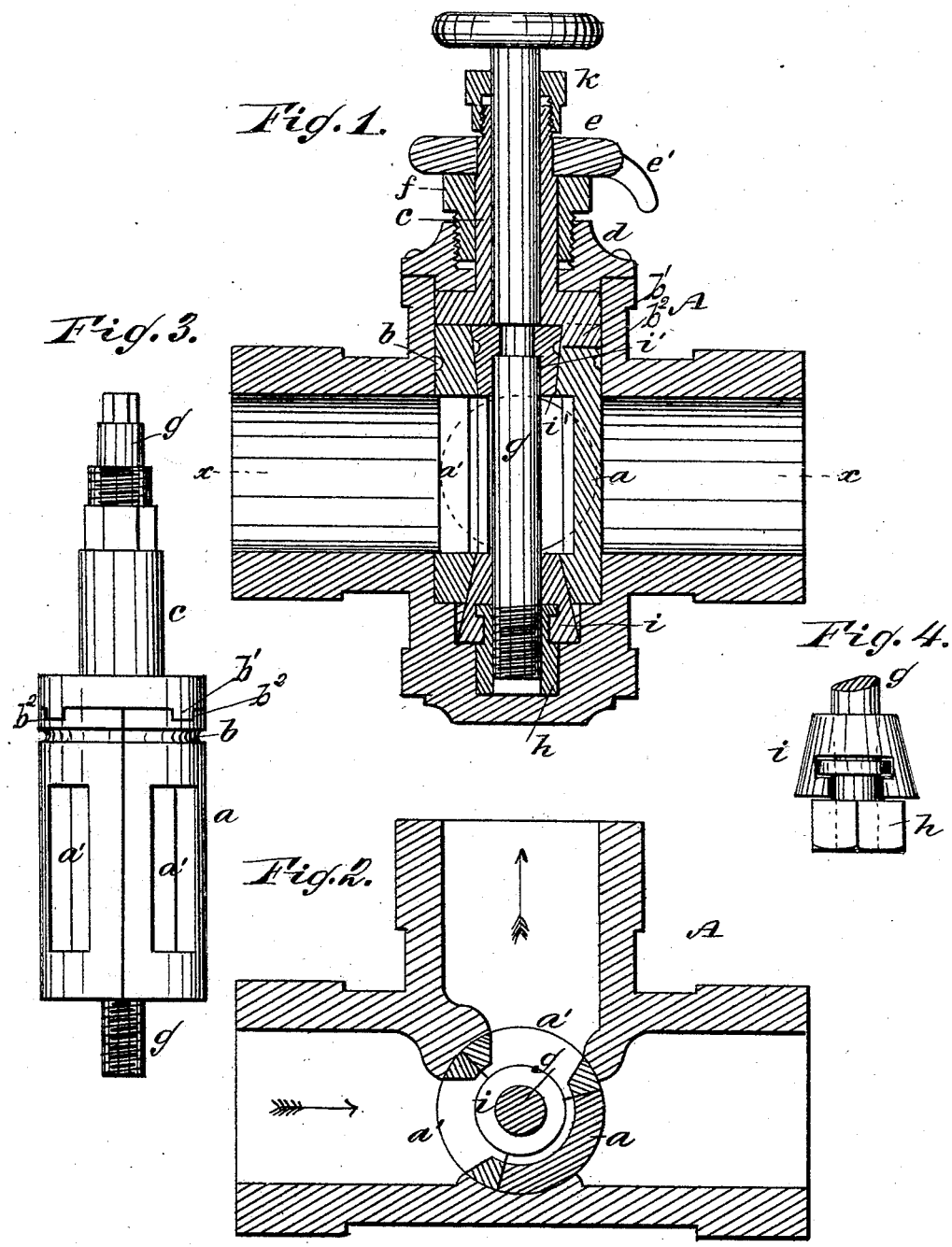

JOSEPH DARLING, OF KARNS CITY, PENNSYLVANIA.

FAUCET OR VALVE.

SPECIFICATION forming part of Letters Patent No. 321,694, dated July 7, 1885.

Application filed June 12, 1884. (No model.)

*To all whom it may concern:*

Be it known that I, JOSEPH DARLING, of Karns City, in the county of Butler and State of Pennsylvania, have invented a new and Improved Faucet or Valve, of which the following is a full, clear, and exact description.

My improvements apply to valves or faucets of the two or three way type; and the invention consists in certain novel features of construction by which advantages not in the common form of valve are obtained, as hereinafter described and claimed.

Reference is to be had to the accompanying drawings, forming part of this specification, in which similar letters of reference indicate corresponding parts in all the figures.

Figure 1 is a central section of a shifting valve of the improved construction. Fig. 2 is a cross-section on line $x$ $x$ of Fig. 1. Fig. 3 is a side elevation of the plug and stem detached, and Fig. 4 is a detail view of the expander.

The body A, with the two outlets, contains a hollow plug or cylinder, $a$, having apertures $a'$ $a'$ for connecting either outlet with the inlet. The plug is divided in the direction of its length into two or more pieces, preferably three, retained in place by the seats at the ends of the plugs and by a contractile ring, $b$, fitted in a groove at one end. $c$ is a tubular stem of the valve, extending through the cap $d$, and carrying a disk or wheel, $e$, on its upper end; and around the stem is a packing-gland, $f$.

In order to allow expansion and contraction of the plug the stem is separate from the plug, it having a disk with lugs $b'$ engaging radial grooves $b^2$ in the head of the plug, as shown clearly in Fig. 3, so that the latter shall turn with the stem. The wheel $e$ has a projection or pointer, $e'$, for indicating, in connection with marks on cap $d$, the open and closed positions of the valve, and the cap is attached by screws in order that it shall be in its proper place when attached.

$g$ is a spindle passing through the stem $c$, and plug $a$, and into a nut, $h$, that is seated in a square recess at the bottom of the valve-body.

$i$ $i'$ are tapering expanders around spindle $g$ and within the top and bottom heads of the plug, which are tapered to receive them. The lower expander, $i$, engages nut $h$ by annular grooves and ribs, as in Fig. 4, and the upper one engages the spindle in the same manner. For turning it the spindle has a wheel on its upper end, and is packed by a cap, $k$, screwed upon stem $c$.

By turning wheel $e$ and the stem $c$ the plug is shifted to open either outlet or close both. In order to tighten the plug in its seats spindle $g$ is turned, with the effect to carry the upper expander, $i'$, downward and raise the lower one, thereby expanding the plug.

Instead of being made as shown, the upper expander may be made similar to the lower one, the nut being set in a recess in stem $c$, and formed with a left-hand thread. The connection of the stem to the plug may also be different from that shown. I do not limit myself in those respects.

These devices may be applied to a three-way or other style of valve. The advantages, in addition to the facility for keeping the plug tight, are that it can be positively known when the valve is full or closed; and, also, that the seats of the turning plug are not subject to wear from gritty particles in the fluid passing through.

It is to be observed, further, that the plug may be set loose enough to turn easily without risk of leakage.

Having thus described my invention, I claim as new and desire to secure by Letters Patent—

1. The combination, with the valve-body, of the hollow divided plug having radial slots, the stem having radial lugs fitting into said slots, the screw-threaded stem working in a nut, and the conical expanders, one having connection with said nut, substantially as and for the purpose set forth.

2. In a valve, the spindle $g$, fitted for endwise movement by a screw and nut, the tapering expanders $i$ $i'$, the divided plug $a$, and hollow stem $c$, one of said expanders having connection with said nut, substantially as described, combined for operation as specified.

3. In a valve, the combination, with expanding plug $a$, of spindle $g$, nut $h$, and stem $c$, and expanders $i\ i'$, substantially as and for the purpose specified.

4. In a valve or faucet, the hollow divided plug, in combination with the screw-threaded stem working in a nut having a neck and annular flange, and the conical expanders, one slotted or constructed to receive said neck and flange of nut, substantially as and for the purpose set forth.

JOSEPH DARLING.

Witnesses:
LUTHER STONE,
S. W. JEWELL.